(12) United States Patent
Mang et al.

(10) Patent No.: US 8,188,013 B2
(45) Date of Patent: *May 29, 2012

(54) SELF-DEGRADING FIBERS AND ASSOCIATED METHODS OF USE AND MANUFACTURE

(75) Inventors: Michael N. Mang, Eden Prairie, MN (US); Bradley L. Todd, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 12/401,736

(22) Filed: Mar. 11, 2009

(65) Prior Publication Data
US 2009/0176665 A1    Jul. 9, 2009

Related U.S. Application Data

(62) Division of application No. 11/047,876, filed on Jan. 31, 2005, now abandoned.

(51) Int. Cl.
*C09K 8/60* (2006.01)
(52) U.S. Cl. .............. 507/219; 507/260; 166/280.1; 166/283; 166/292; 166/295; 166/305.1
(58) Field of Classification Search .......... 507/219, 507/260; 166/280, 283, 292, 295, 305.1
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |

(Continued)

FOREIGN PATENT DOCUMENTS
EP    0 418 082 A1    9/1990
(Continued)

OTHER PUBLICATIONS

Berstein et al, Nylon 6.6 accelerated aging studies: thermal-oxidative degradation and its interaction with hydrolysis, Polymer Degradation and Stability 88, 2005, 480-488.*

(Continued)

*Primary Examiner* — Alicia Toscano
(74) *Attorney, Agent, or Firm* — Robert A. Kent; McDermott Will & Emery LLP

(57) ABSTRACT

This invention relates to the use of degradable fibers, and more particularly, to self-degrading fibers and their associated methods of use and manufacture. In one embodiment, the present invention provides a self degrading fiber comprising: an outer shell, and a core liquid.

17 Claims, 3 Drawing Sheets

U.S. PATENT DOCUMENTS

| | | |
|---|---|---|
| 3,955,993 A | 5/1976 | Curtice |
| 3,960,736 A | 6/1976 | Free et al. |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,169,798 A | 10/1979 | DeMartino |
| 4,172,066 A | 10/1979 | Zweigle et al. |
| 4,261,421 A | 4/1981 | Watanabe |
| 4,265,673 A | 5/1981 | Pace et al. |
| 4,299,825 A | 11/1981 | Lee |
| 4,322,381 A | 3/1982 | Joh |
| 4,323,627 A | 4/1982 | Joh et al. |
| 4,342,711 A | 8/1982 | Joh et al. |
| 4,385,017 A | 5/1983 | Joh et al. |
| 4,387,769 A | 6/1983 | Erbstoesser et al. |
| 4,388,256 A | 6/1983 | Ishida et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. |
| 4,750,562 A * | 6/1988 | Jennings, Jr. ............... 166/281 |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. |
| 4,848,467 A | 7/1989 | Cantu et al. |
| 4,863,980 A | 9/1989 | Cowan et al. |
| 4,867,934 A | 9/1989 | Repetti et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. |
| 4,965,128 A * | 10/1990 | Greidanus et al. ............ 428/398 |
| 4,986,353 A | 1/1991 | Clark et al. |
| 4,986,354 A | 1/1991 | Cantu et al. |
| 4,986,355 A | 1/1991 | Casad et al. |
| 5,034,139 A | 7/1991 | Reid et al. |
| 5,082,056 A | 1/1992 | Tackett, Jr. |
| 5,142,023 A | 8/1992 | Gruber et al. |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair |
| 5,247,059 A | 9/1993 | Gruber et al. |
| 5,249,628 A | 10/1993 | Surjaatmadja |
| 5,251,697 A | 10/1993 | Shuler |
| 5,295,542 A | 3/1994 | Cole et al. |
| 5,304,620 A | 4/1994 | Holtmyer et al. |
| 5,314,031 A | 5/1994 | Hale et al. |
| 5,325,923 A | 7/1994 | Surjaatmadja et al. |
| 5,330,005 A | 7/1994 | Card et al. |
| 5,359,026 A | 10/1994 | Gruber |
| 5,360,068 A | 11/1994 | Sprunt et al. |
| 5,363,916 A | 11/1994 | Himes et al. |
| 5,373,901 A | 12/1994 | Norman et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A * | 8/1995 | Card et al. ............... 166/280.2 |
| 5,460,226 A | 10/1995 | Lawton et al. |
| 5,464,060 A | 11/1995 | Hale et al. |
| 5,475,080 A | 12/1995 | Gruber et al. |
| 5,484,881 A | 1/1996 | Gruber et al. |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. |
| 5,499,678 A | 3/1996 | Surjaatmadja et al. |
| 5,501,275 A | 3/1996 | Card et al. |
| 5,501,276 A | 3/1996 | Weaver et al. |
| 5,505,787 A | 4/1996 | Yamaguchi |
| 5,512,071 A | 4/1996 | Yam et al. |
| 5,536,807 A | 7/1996 | Gruber et al. |
| 5,555,936 A | 9/1996 | Pirri et al. |
| 5,591,700 A | 1/1997 | Harris et al. |
| 5,594,095 A | 1/1997 | Gruber et al. |
| 5,602,083 A | 2/1997 | Gabrysch et al. |
| 5,604,186 A | 2/1997 | Hunt et al. |
| 5,607,905 A | 3/1997 | Dobson, Jr. et al. |
| 5,613,558 A | 3/1997 | Dillenbeck |
| 5,670,473 A | 9/1997 | Scepanski |
| 5,697,440 A | 12/1997 | Weaver et al. |
| 5,698,322 A | 12/1997 | Tsai et al. |
| 5,723,416 A | 3/1998 | Liao |
| 5,765,642 A | 6/1998 | Surjaatmadja |
| 5,783,527 A | 7/1998 | Dobson, Jr. et al. |
| 5,791,415 A | 8/1998 | Nguyen et al. |
| 5,795,591 A | 8/1998 | Lee et al. |
| 5,799,734 A | 9/1998 | Normal et al. |
| 5,833,000 A | 11/1998 | Weaver et al. |
| 5,849,401 A | 12/1998 | El-Afandi et al. |
| 5,853,048 A | 12/1998 | Weaver et al. |
| 5,893,416 A | 4/1999 | Read |
| 5,908,073 A | 6/1999 | Nguyen et al. |
| 5,916,849 A | 6/1999 | House |
| 5,924,488 A | 7/1999 | Nguyen et al. |
| 5,964,291 A | 10/1999 | Bourne et al. |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. |
| 6,024,170 A | 2/2000 | McCabe et al. |
| 6,028,113 A | 2/2000 | Scepanski |
| 6,047,772 A | 4/2000 | Weaver et al. |
| 6,110,875 A | 8/2000 | Tjon-Joe-Pin et al. |
| 6,114,410 A | 9/2000 | Betzold |
| 6,123,159 A | 9/2000 | Brookey et al. |
| 6,123,965 A | 9/2000 | Jacob et al. |
| 6,131,661 A | 10/2000 | Conner et al. |
| 6,135,987 A | 10/2000 | Tsai et al. |
| 6,143,698 A | 11/2000 | Murphey et al. |
| 6,148,917 A | 11/2000 | Brookey et al. |
| 6,162,766 A | 12/2000 | Muir et al. |
| 6,169,058 B1 | 1/2001 | Le et al. |
| 6,172,011 B1 | 1/2001 | Card et al. |
| 6,189,615 B1 | 2/2001 | Sydansk |
| 6,202,751 B1 | 3/2001 | Chatterji et al. |
| 6,209,643 B1 | 4/2001 | Nguyen et al. |
| 6,209,646 B1 | 4/2001 | Reddy et al. |
| 6,214,773 B1 | 4/2001 | Harris et al. |
| 6,242,390 B1 * | 6/2001 | Mitchell et al. ............... 507/211 |
| 6,260,622 B1 | 7/2001 | Blok et al. |
| 6,291,013 B1 | 9/2001 | Gibson et al. |
| 6,300,286 B1 | 10/2001 | Dobson, Jr. et al. |
| 6,302,209 B1 | 10/2001 | Thompson et al. |
| 6,308,788 B1 | 10/2001 | Patel et al. |
| 6,311,773 B1 | 11/2001 | Todd et al. |
| 6,323,307 B1 | 11/2001 | Bigg et al. |
| 6,326,458 B1 | 12/2001 | Gruber et al. |
| 6,328,105 B1 | 12/2001 | Betzold |
| 6,330,917 B2 | 12/2001 | Chatterji et al. |
| 6,357,527 B1 | 3/2002 | Norman et al. |
| 6,364,945 B1 | 4/2002 | Chatterji et al. |
| 6,380,138 B1 | 4/2002 | Ischy et al. |
| 6,387,986 B1 | 5/2002 | Moradi-Araghi et al. |
| 6,390,195 B1 | 5/2002 | Nguyen et al. |
| 6,394,185 B1 | 5/2002 | Constien |
| 6,422,314 B1 | 7/2002 | Todd et al. |
| 6,422,326 B1 | 7/2002 | Brookey et al. |

| Patent Number | Date | Inventor(s) |
|---|---|---|
| 6,432,155 B1 | 8/2002 | Swazey et al. |
| 6,454,003 B1 | 9/2002 | Chang et al. |
| 6,485,947 B1 | 11/2002 | Rajgarhia et al. |
| 6,488,763 B2 | 12/2002 | Brothers et al. |
| 6,494,263 B2 | 12/2002 | Todd |
| 6,508,305 B1 | 1/2003 | Brannon et al. |
| 6,509,301 B1 | 1/2003 | Vollmer et al. |
| 6,527,051 B1 | 3/2003 | Reddy et al. |
| 6,554,071 B1 | 4/2003 | Crook et al. |
| 6,566,310 B2 | 5/2003 | Chan |
| 6,569,814 B1 | 5/2003 | Brady et al. |
| 6,578,630 B2 | 6/2003 | Simpson et al. |
| 6,599,863 B1 | 7/2003 | Palmer et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,702,023 B1 | 3/2004 | Harris et al. |
| 6,710,019 B1 | 3/2004 | Sawdon et al. |
| 6,716,797 B2 | 4/2004 | Brookey |
| 6,737,385 B2 | 5/2004 | Todd et al. |
| 6,761,218 B2 | 7/2004 | Nguyen et al. |
| 6,763,888 B1 | 7/2004 | Harris et al. |
| 6,764,981 B1 | 7/2004 | Eoff et al. |
| 6,793,018 B2 | 9/2004 | Dawson et al. |
| 6,793,730 B2 | 9/2004 | Reddy et al. |
| 6,806,235 B1 | 10/2004 | Mueller et al. |
| 6,817,414 B2 | 11/2004 | Lee |
| 6,818,594 B1 | 11/2004 | Freeman et al. |
| 6,837,309 B2 | 1/2005 | Boney et al. |
| 6,883,608 B2 | 4/2005 | Parlar et al. |
| 6,896,058 B2 | 5/2005 | Munoz, Jr. et al. |
| 6,904,971 B2 | 6/2005 | Brothers et al. |
| 6,949,491 B2 | 9/2005 | Cooke, Jr. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,007,752 B2 | 3/2006 | Reddy et al. |
| 7,021,377 B2 | 4/2006 | Todd et al. |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,063,151 B2 | 6/2006 | Nguyen et al. |
| 7,066,258 B2 | 6/2006 | Justus et al. |
| 7,069,994 B2 | 7/2006 | Cooke, Jr. |
| 7,080,688 B2 | 7/2006 | Todd et al. |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,140,438 B2 | 11/2006 | Frost et al. |
| 7,147,067 B2 | 12/2006 | Getzalf et al. |
| 7,151,077 B2 | 12/2006 | Prud'homme et al. |
| 7,156,174 B2 | 1/2007 | Roddy et al. |
| 7,165,617 B2 | 1/2007 | Lord et al. |
| 7,168,489 B2 | 1/2007 | Frost et al. |
| 7,172,022 B2 | 2/2007 | Reddy et al. |
| 7,178,596 B2 | 2/2007 | Blauch et al. |
| 7,195,068 B2 | 3/2007 | Todd |
| 7,204,312 B2 | 4/2007 | Roddy et al. |
| 7,219,731 B2 | 5/2007 | Sullivan et al. |
| 7,228,904 B2 | 6/2007 | Todd et al. |
| 7,261,156 B2 | 8/2007 | Nguyen et al. |
| 7,264,051 B2 | 9/2007 | Nguyen et al. |
| 7,267,170 B2 * | 9/2007 | Mang et al. ............... 166/279 |
| 7,276,466 B2 | 10/2007 | Todd et al. |
| 7,299,869 B2 | 11/2007 | Kalman |
| 7,303,014 B2 | 12/2007 | Reddy et al. |
| 7,306,037 B2 | 12/2007 | Nguyen et al. |
| 7,322,412 B2 | 1/2008 | Badalamenti et al. |
| 7,353,876 B2 * | 4/2008 | Savery et al. ............. 166/308.5 |
| 7,353,879 B2 | 4/2008 | Todd et al. |
| 7,413,017 B2 | 8/2008 | Nguyen et al. |
| 7,475,728 B2 | 1/2009 | Pauls et al. |
| 7,497,258 B2 * | 3/2009 | Savery et al. ............... 166/292 |
| 2001/0016562 A1 | 8/2001 | Muir et al. |
| 2002/0036088 A1 | 3/2002 | Todd |
| 2002/0119169 A1 | 8/2002 | Angel et al. |
| 2002/0125012 A1 | 9/2002 | Dawson et al. |
| 2003/0054962 A1 | 3/2003 | England et al. |
| 2003/0060374 A1 | 3/2003 | Cooke, Jr. |
| 2003/0114314 A1 | 6/2003 | Ballard et al. |
| 2003/0130133 A1 | 7/2003 | Vollmer |
| 2003/0147965 A1 | 8/2003 | Bassett et al. |
| 2003/0188766 A1 | 10/2003 | Banerjee et al. |
| 2003/0230407 A1 | 12/2003 | Vijn et al. |
| 2003/0234103 A1 | 12/2003 | Lee et al. |
| 2004/0014606 A1 | 1/2004 | Parlar et al. |
| 2004/0014607 A1 | 1/2004 | Sinclair et al. |
| 2004/0040706 A1 | 3/2004 | Hossaini et al. |
| 2004/0055747 A1 | 3/2004 | Lee |
| 2004/0070093 A1 | 4/2004 | Mathiowitz et al. |
| 2004/0094300 A1 | 5/2004 | Sullivan et al. |
| 2004/0099416 A1 | 5/2004 | Vijn et al. |
| 2004/0106525 A1 | 6/2004 | Willbert et al. |
| 2004/0138068 A1 * | 7/2004 | Rimmer et al. ............. 507/100 |
| 2004/0152601 A1 * | 8/2004 | Still et al. .................. 507/100 |
| 2004/0152602 A1 | 8/2004 | Boles |
| 2004/0162386 A1 | 8/2004 | Altes et al. |
| 2004/0170836 A1 | 9/2004 | Bond et al. |
| 2004/0214724 A1 | 10/2004 | Todd et al. |
| 2004/0216876 A1 | 11/2004 | Lee |
| 2004/0231845 A1 | 11/2004 | Cooke, Jr. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2004/0261999 A1 | 12/2004 | Nguyen |
| 2005/0006095 A1 | 1/2005 | Justus et al. |
| 2005/0028976 A1 | 2/2005 | Nguyen |
| 2005/0034861 A1 | 2/2005 | Saini et al. |
| 2005/0034865 A1 | 2/2005 | Todd et al. |
| 2005/0034868 A1 | 2/2005 | Frost et al. |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0103496 A1 | 5/2005 | Todd et al. |
| 2005/0126785 A1 | 6/2005 | Todd et al. |
| 2005/0183741 A1 | 8/2005 | Surjaatmadja et al. |
| 2005/0205265 A1 | 9/2005 | Todd et al. |
| 2005/0252659 A1 | 11/2005 | Sullivan et al. |
| 2005/0272613 A1 | 12/2005 | Cooke, Jr. |
| 2005/0277554 A1 | 12/2005 | Blauch et al. |
| 2006/0014648 A1 * | 1/2006 | Milson et al. .............. 507/213 |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0054324 A1 * | 3/2006 | Sullivan et al. ............. 166/308.1 |
| 2006/0065397 A1 | 3/2006 | Nguyen et al. |
| 2006/0105917 A1 | 5/2006 | Munoz, Jr. |
| 2006/0105918 A1 | 5/2006 | Munoz, Jr. et al. |
| 2006/0169182 A1 | 8/2006 | Todd et al. |
| 2006/0169452 A1 * | 8/2006 | Savery et al. ............... 166/280.2 |
| 2006/0169453 A1 * | 8/2006 | Savery et al. ............... 166/280.2 |
| 2006/0172891 A1 | 8/2006 | Gewehr et al. |
| 2006/0172893 A1 | 8/2006 | Todd et al. |
| 2006/0283597 A1 | 12/2006 | Schriener et al. |
| 2007/0235190 A1 | 10/2007 | Lord et al. |
| 2007/0298977 A1 | 12/2007 | Mang et al. |

FOREIGN PATENT DOCUMENTS

| | | |
|---|---|---|
| EP | 418082 A1 * | 3/1991 |
| EP | 0 510 762 A2 | 4/1992 |
| EP | 0 543 355 A2 | 11/1992 |
| EP | 0 879 935 A3 | 10/1999 |
| EP | 1 413 710 A1 | 4/2004 |
| GB | 2 412 389 | 3/2004 |
| JP | 2004181820 | 7/2004 |
| WO | WO 93/15127 | 8/1993 |
| WO | WO 94/07949 | 4/1994 |
| WO | WO 94/08078 | 4/1994 |
| WO | WO 94/08090 | 4/1994 |

| WO | WO 95/09879 | 4/1995 |
| WO | WO 97/11845 | 4/1997 |
| WO | WO 99/27229 | 6/1999 |
| WO | WO 00/57022 | 9/2000 |
| WO | WO 0102698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Arnold et al, Chemistry and Kinetics of Polyimide Degradation, Ind. Eng. Chem. Prod. Res. Develop. vol. 11, No. 3, 1972.*
Plastic Material data sheets, polyimide and nylon density tables, MatWeb, 2004.*
Kiyoshi Matsuyama et al, *Environmentally Benign Formation of Polymeric Microspheres by Rapid Expansion of Supercritical Carbon Dioxide Solution With a Nonsolvent*, Environ Sci Technol 2001, vol. 35, 4149-4155.
Notice of Allowance dated Jul. 5, 2007 from U.S. Appl. No. 11/048,417.
Office Action dated Jan. 12, 2007 from U.S. Appl. No. 11/048,417.
Definition of Blood pH. Downloaded from http://www.medterms.com/script/main/art.asp?articlekey=10001 on Feb. 24, 2009.
Cardiac Enzymes Studies article. Downloaded from http://www.webmd.com/heartdisease/cardiac-enzyme-studies on Feb. 24, 2009, Sep. 13, 2007.
Simmons, et al., *Poly(phenyllactide): Synthesis, Characterization, and Hydrolytic Degradation*, Biomacromolecules, vol. 2, No. 2, 2001 (pp. 658-663), 2001.
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived from Substituted Lactic Acids*, American Chemical Society, Ch. 12, 2001 (pp. 147-159).
Cantu, et al., *Laboratory and Field Evaluation of a Combined Fluid-Loss-Control Additive and Gel Breaker for Fracturing Fluids*, SPE 18211, Society of Petroleum Engineers, 1990.
Love, et al., *Selectively Placing Many Fractures in Openhole Horizontal Wells Improves Production*, SPE 50422, Society of Petroleum Engineers, 1998.
McDaniel, et al., *Evolving New Stimulation Process Proves Highly Effective in Level I Dual-Lateral Completion*, SPE 78697, Society of Petroleum Engineers, 2002.
Albertsson, et al., *Aliphatic Polyesters: Synthesis, Properties and Applications*, Advances in Polymer Science, vol. 157, 2002.
Dechy-Cabaret, et al., *Controlled Ring-Opening Polymerization of Lactide and Glycolide*, American Chemical Society, Chemical Reviews, A-Z, AA-AD, received 2004.
Funkhouser, et al., *Synthetic Polymer Fracturing Fluid for High-Temperature Applications*, SPE 80236, Society of Petroleum Engineers, 2003.
Chelating Agents, Encyclopoedia of Chemical Technology, vol. 5 (764-795), 2001.
Vichaibun, et al., A New Assay for the Enzymatic Degradation of Polylactic Acid, Short Report, ScienceAsia, vol. 29, 2003 (pp. 297-300).
Halliburton *SurgiFrac$^{SM}$ Service, A Quick and Cost-Effective Method to Help Boost Production From Openhole Horizontal Completions*, Halliburton Communications, H03297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *Cobra Frac$^{SM}$ Service, Cost-Effective Technology That Can Help Reduce Cost Per BOE Produced, Shorten Cycle Time and Reduce Capex*, Halliburton Communications, Apr. 2003.
Blauch, et al., *Aqueous Tackifier and Methods of Controlling Particulates*, U.S. Appl. No. 10/864,061, filed Jun. 9, 2004.

Blauch, et al., *Aqueous-Based Tackifier Fluids and Methods of Use*, U.S. Appl. No. 10/864,618, filed Jun. 9, 2004.
*Polymer Processes, Chemical Technology of Plastics, Resins, Rubbers, Adhesives and Fibers*, Interscience Publishers Inc., New York, p. 876, 1956.
Mc-Graw-Hill Encyclopedia of Science & Technology, 5th Edition, McGraw-Hill Book Company, New York, p. 461, 1982.
Thesaurus of Textile Terms Covering Fibrous Materials and Processes, Second Edition, The M.I.T. Press, pp. xiii & 109, 1969.
*Manufacturing: Synthetic and Cellulosic Fiber Formation Technology*, American Fiber Manufacturers Association/Fiber Economics Bureau website, 2004.
Y. Chaing, et al., *Hydrolysis of Ortho Esters: Further Investigation of the Factors Which Control the Rate-Determining Step*, Engineering Information Inc., NY, NY, vol. 105, No. 23 (XP-002322842), Nov. 16, 1983.
M. Ahmad, et al., *Ortho Ester Hydrolysis: Direct Evidence for a Three-Stage Reaction Mechanism*, Engineering Information Inc., NY, NY, vol. 101, No. 10 (XP-002322843), May 9, 1979.
Skrabal, et al., *The Hydrolysis Rate of Orthoformic Acid Ethyl Ether*, Chemical Institute of the University of Graz, pp. 1-38, Jan. 13, 2021.
Heller, et al., *Poly(ortho esters)—From Concept to Reality*, Biomacromolecules, vol. 5, No. 5, 2004, pp. 1625-1632, May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999, pp. 301-307.
Ng, et al., *Development of a Poly(ortho ester) Prototype with a Latent Acid in the Polymer Backbone for 5-fluorouracil Delivery*, Journal of Controlled Release 65, pp. 367-374, 2000.
Ng, et al., *Synthesis and Erosion Studies of Self-Catalyzed Poly(ortho ester)s*, American Chemical society, vol. 30, No. 4, 1997 (pp. 770-772).
Rothen-Weinhold, et al., *Release of BSA from poly(ortho ester) extruded thin strands*, Journal of Controlled Release 71, pp. 31-37, 2001.
Heller, et al., *Poly(ortho ester)s—their development and some recent applications*, European Journal of Pharmaceutics and Biopharmaceutics, 50, pp. 121-128, 2000.
Heller, et al., *Poly(ortho esters) for the Pulsed and Continuous Delivery of Peptides and Proteins*, Controlled Release and Biomedical polymers Department, SRI International, pp. 39-46, 1995.
Heller, et al., *Poly(ortho esters); synthesis, characterization, properties and uses*, Advanced Drug Delivery Reviews, 54, 2002 (pp. 1015-1039).
Zignani, et al., *Subconjunctival biocompatibility of a viscous bioerodable poly(ortho ester)*, J. Biomed Mater Res. 39, pp. 277-285, 1998.
Toncheva, et al., *Use of Block Copolymers of Poly(Ortho Esters) and Poly(Ethylene Glycol)*, Journal of Drug Targeting, 2003, vol. 11(6), pp. 345-353.
Schwach-Abdellaoui, et al., *Control of Molecular Weight for Auto-Catalyzed Poly(ortho ester) Obtained by Polycondensation Reaction*, International Journal of polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11, pp. 727-731.
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemical "Trigger" Useful for Oilfield Applications*, Society of Petroleum Engineers, Inc., SPE 92709, Feb. 4, 2005.
Search Report and Written Opinion No. PCT/GB2006/000064, Sep. 1, 2006.
Office Action dated Jul. 13, 2007 from U.S. Appl. No. 11/047,876.
Office Action dated Jan. 22, 2008 from U.S. Appl. No. 11/047,876.
Office Action dated Jul. 2, 2008 from U.S. Appl. No. 11/047,876.
Office Action dated Jan. 9, 2009 from U.S. Appl. No. 11/047,876.

* cited by examiner

SELF-DEGRADING FIBERS AND ASSOCIATED METHODS OF USE AND MANUFACTURE

CROSS-REFERENCE TO RELATED APPLICATIONS

This application is a divisional application of U.S. patent application Ser. No. 11/047,876, entitled "Self-Degrading Fibers and Associated Methods of Use and Manufacture," filed on Jan. 31, 2005 now abandoned by Mang et al., the entirety of which is herein incorporated by reference for all purposes.

BACKGROUND

The present invention relates to the use of degradable fibers, and more particularly, to self-degrading fibers and their associated methods of manufacture and use in subterranean applications.

Degradable materials are increasingly becoming of interest in various subterranean applications based, at least in part, on their ability to degrade or produce desirable degradation products (e.g., acids). One particular degradable material that has received recent attention is poly(lactic acid) ("PLA") because it is a material that will degrade down hole after it has performed a desired function or because its degradation products will perform a desired function (e.g., degrade an acid soluble component).

This invention relates to degradable fibers that may be used in any subterranean application wherein it is desirable to include degradable fibers, for instance, to create voids or produce associated degradation products. Examples of suitable applications include cementing, fracturing, and gravel packing, as well as other applications wherein it may be desirable to produce voids or particular degradation products through the degradation of self-degrading fibers.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. Hydraulic cement compositions also are used in remedial cementing operations such as plugging highly permeable zones or fractures in well bores, plugging cracks in holes in pipe strings, and the like. In additional applications, hydraulic cement compositions may be used in fracturing and gravel packing applications to form packs that are similar to gravel packs or proppant packs.

Hydraulic fracturing techniques are commonly used to stimulate subterranean formations to enhance the production of desirable fluids therefrom. In a conventional hydraulic fracturing process, a fracturing fluid is pumped down a well bore and into a fluid-bearing formation. The fracturing fluid is pumped into the formation under a pressure sufficient to create or enlarge fissures in the formation. Fracturing fluids used in conventional hydraulic fracturing techniques include: fresh water, brine, liquid hydrocarbons, gelled water, or gelled brine. The fracturing fluid may contain a viscosifying or gelling agent to increase its viscosity. The fracturing fluid typically also will contain a proppant that will be deposited in the fractures. Commonly used proppant particulates include particulate materials like sand, walnut shells, glass beads, metal pellets, and ceramic beads. The deposited proppant particulates often form proppant packs in the fractures to help to maintain the integrity of those fractures in the formation.

There have been attempts to use cement compositions as propping agents. Cement compositions are desirable in this application because of their high strength and low cost. In conventional methods, such cement compositions when used as propping agents often contain particulate carbonate salts. In theory, when the carbonate salts are removed from the cement composition at some point before the cement composition develops substantial compressive strength, the resultant cement matrix has some degree of permeability, which allows formation fluids to flow to the well bore. Carbonate salts, however, require an acid to dissolve out of the cement composition. Acid treatment may be unreliable because acid tends to find the path of least resistance within the cement composition, which results in uneven distribution of acid and resultant removal of carbonate salt particulates. Thus, the resultant permeability usually is not sufficient for hydrocarbon production. Moreover, the use of acid undermines the integrity of the cement by destabilizing the structure of the cement matrix, thus weakening the cement strength or consolidation.

Additionally, oil, gas, and water producing wells often are completed in unconsolidated subterranean formations containing loose or incompetent sands that can flow into the well bores with produced fluids. The presence of this sand in the produced fluids is undesirable as it, inter alias may erode equipment, which often substantially increases the costs associated with operating such wells and generally reduces the fluid production capability of the formation. Incompetent subterranean formations include those which contain loose sand that is readily entrained by produced fluids, and those wherein the bonded sand particles comprising the formations lack sufficient bond strength to withstand the forces produced by the intermittent production of fluids from the formations.

Heretofore, unconsolidated formations have been treated by creating fractures in the formations and depositing proppant material, e.g., sand of a selected size, in the fractures to substantially preserve the fractures. In addition, the proppant has heretofore been consolidated within the fractures into hard permeable masses to prevent the proppant from flowing back and to reduce the migration of sand through the fractures with produced fluids. Further, costly "gravel packs," which may include sand screens, slotted liners, perforated shrouds, and the like, have been utilized in wells to prevent the production of formation sand. In conventional gravel packing operations, graded sand is placed in the annulus between a screen and the walls of the well bore in the producing interval. The resulting structure provides a barrier to migrating sand while allowing desired fluids to flow into the well bore so that they may be produced.

While gravel packs may prevent the production of sand with formation fluids, they often fail and require replacement. This may be due to, for example, the deterioration of the screen as a result of corrosion or the like. The initial installation of a gravel pack adds considerable expense to the cost of completing a well, and the removal and replacement of a failed gravel pack is even more costly.

In horizontal well bores formed in unconsolidated formations, the well bores are often completed open hole, e.g., a casing is not inserted into the well bore. In open hole well bores, oftentimes a slotted liner, sand control screen, gravel pack, or the like is installed into the uncased well bore. This method of completion may be problematic as discussed above in that as the incompetent formation tends to break down as a result of production, the slotted liner, sand control screen, or gravel pack is often bypassed, which may result in formation sand being produced along with formation fluids.

There have been attempts to use a sort of permeable cement in subsurface applications such as gravel packs wherein the permeable cement composition contains a particulate, such as a carbonate salt or oil-soluble resin particulate, that is dissolvable with the addition of a second fluid, e.g., an acid or a hydrocarbon. The thought behind this approach is generally that when the dissolvable particulate dissolves out of the cement mass, voids are left in the cement mass so that the cement mass has some degree of permeability to formation fluids. Such permeable cement compositions and methods, however, have not been successful because the permeability of the cement mass once the particulate is dissolved out has not been satisfactory. This lack of permeability is caused by, inter alia, the dissolvable particulate's dependence on contact with a second solvent. Oftentimes, the solvent is not able to interact with a sufficient amount of the dissolvable particulate to adequately dissolve a sufficient amount of the particulate. As a result, not enough of the particulate is dissolved out of the cement mass to make the cement mass's permeability suitable for subsurface applications such as gravel packing.

SUMMARY

The present invention relates to the use of degradable fibers, and more particularly, to self-degrading fibers and their associated methods of use and manufacture.

In one embodiment, the present invention provides a self degrading fiber comprising: an outer shell, and a core liquid.

In another embodiment, the present invention provides a subterranean treatment fluid comprising a base fluid and a plurality of self-degrading fibers, the self-degrading fibers comprising an outer shell and a core fluid.

In another embodiment, the present invention provides a cement composition comprising a hydraulic cement, and a plurality of self-degrading fibers, the self-degrading fibers comprising an outer shell and a core fluid.

The features and advantages of the present invention will be readily apparent to those skilled in the art upon a reading of the description of the embodiments that follows.

DRAWINGS

The following figures form part of the present specification and are included to further demonstrate certain aspects of the present invention. The invention may be better understood by reference to one or more of these drawings in combination with the description of embodiments presented herein.

DESCRIPTION

Figure 1A:
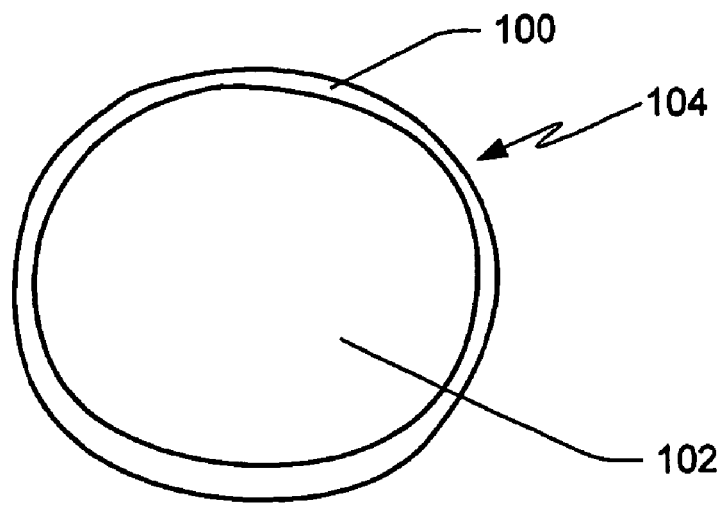
FIG. 1A depicts one embodiment of a round cross-section of a self-degrading fiber of this invention.

The present invention relates to the use of degradable fibers, and more particularly, to self-degrading fibers and their associated methods of use and manufacture. The self-degrading fibers of this invention comprise degradable hollow fibers. Hollow fibers are used widely in various fields.

The self-degrading fibers of this invention may be used in any subterranean application wherein it is desirable for the self-degrading fibers to degrade, e.g., to leave voids, act as a temporary restriction to the flow of a fluid, or produce desirable degradation products. The self-degrading fibers and methods of this invention may be especially beneficial in any application in which the self-degrading fibers will be used does not contain a component that will enable the outer shell of the fibers to degrade, e.g., in a dry gas hole. Moreover, the self-degrading fibers of the present invention are especially suitable for subterranean applications including, but not limited to, cementing (e.g., regular or acid soluble cement compositions), fracturing, or gravel packing applications.

The self-degrading fibers of the present invention comprise an outer shell and a core liquid. The outer shell comprises a degradable polymer, and substantially retains the core liquid. The outer shells of the self-degrading fibers of this invention comprise degradable polymers that are subject to hydrolytic degradation. The core liquids comprise liquids that are able to at least partially facilitate or catalyze the hydrolysis of the degradable polymers in the outer shells. Optionally, the self-degrading fibers of this invention may comprise a coating on the outer shell and/or a suitable additive in the core liquid, e.g., an additive chosen to interact with the degradable polymer, its degradation products, or the surrounding subterranean environment. In preferred embodiments, the outer shell is not porous.

The self-degrading fibers of this invention may have any cross-sectional shape including, but not limited to, round, oval, trilobal, star, flat, rectangular, etc. FIGS. 1A through 1F illustrate some embodiments of such cross-sections. One should note that certain cross-sectional shapes may allow for varying volumes of core liquids to be included in the fibers. For instance, a round cross-section may allow for a larger volume of a core liquid to be retained within the outer shell, which may be desirable in certain applications when more of the core liquid will be beneficial. One should be mindful that the core liquid should be included in an amount sufficient to allow for hydrolysis of the outer shell of a given self-degrading fiber taking into account all environmental factors. The desired hydrolysis characteristics also will affect the ratio of the outer shell to the core liquid in a particular self-degrading fiber. One guideline that may be helpful in certain applications wherein poly(lactic acid) is included in the outer shell is that about 0.25 grams of water is needed for 1 gram of poly (lactic acid). The particular cross-sectional shape chosen for the self-degrading fibers that will be used in a given application may be dictated, inter alia, by the circumstances surrounding the application (e.g., the environmental factors), the desired geometry of any voids that will be created as a result of the degradation of the self-degrading fibers, the time needed to restrict the flow of a fluid, and by the amount of core liquid needed to encourage degradation of the self-degrading fibers. When the self-degrading fibers are used in an application wherein they will degrade to leave voids, one should be mindful that the diameter of the fibers should relate to the size and shape of the voids that will result after degradation of the self-degrading fibers.

FIG. 1A depicts one embodiment of a round cross-section of a self-degrading fiber of this invention. Shown generally in FIG. 1A are fiber end 104, outer shell 100, and core liquid 102, which is contained within outer shell 100. Note that outer shell 100 retains core liquid 102 but does not completely enclose it (i.e., fiber end 104 is not closed by the outer shell). In some embodiments, fiber end 104 may be closed if desired.

Figure 1B:
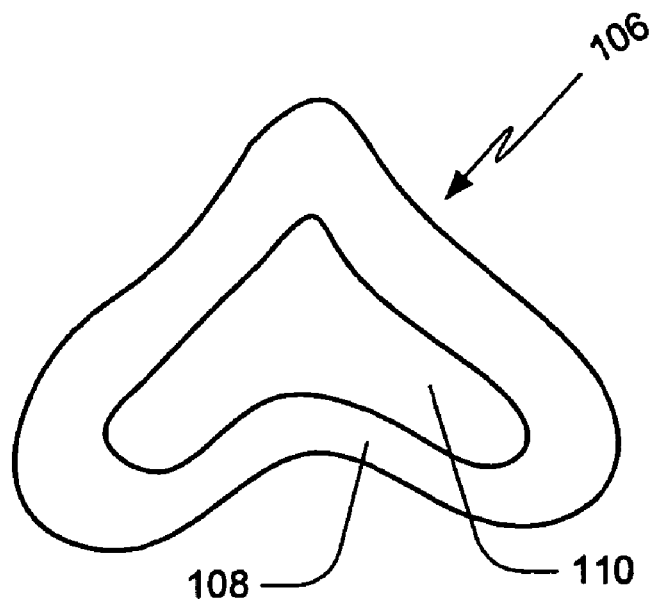
FIG. 1B illustrates an embodiment of a trilobal cross-section of a self-degrading fiber of this invention.

FIG. 1B illustrates an embodiment of a trilobal cross-section of a self-degrading fiber of this invention. Shown generally is fiber end 106, outer shell 108, and core liquid 110. One should note that in some embodiments fiber end 106 may be closed (not pictured in FIG. 1B).

Figure 1C:
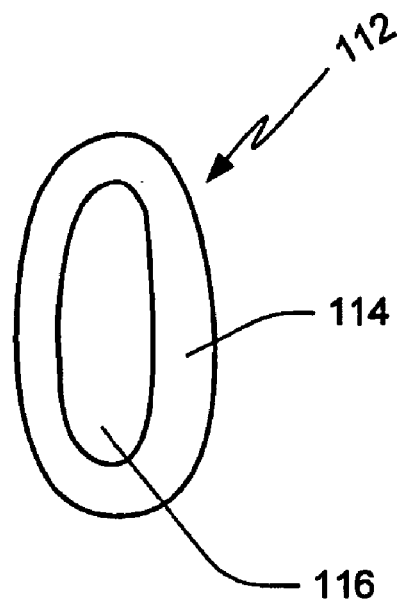
FIG. 1C illustrates another embodiment of an oval cross-section of a self-degrading fiber of this invention.

FIG. 1C illustrates another embodiment of an oval cross-section of a self-degrading fiber of this invention. Shown generally is fiber end 112, outer shell 114, and core liquid 116. One should note that in some embodiments fiber end 112 may be closed (not pictured in FIG. 1C).

Figure 1D:
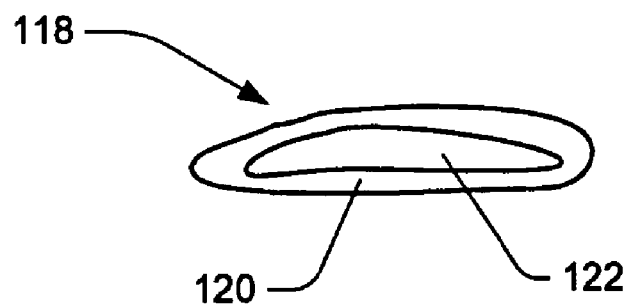
FIG. 1D illustrates another embodiment of a flat cross-section of a self-degrading fiber of this invention.

FIG. 1D illustrates another embodiment of a flat cross-section of a self-degrading fiber of this invention. Shown generally is fiber end 118, outer shell 120, and core liquid 122. One should note that in some embodiments fiber end 118 may be closed (not pictured in FIG. 1D).

Figure 1E:
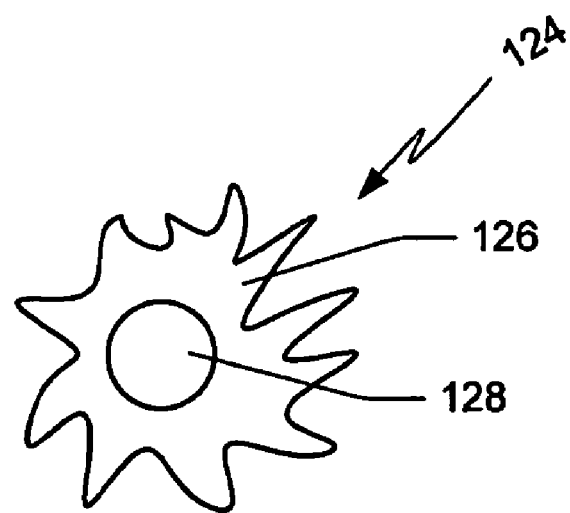
FIG. 1E illustrates another embodiment of a star cross-section of a self-degrading fiber of this invention.

FIG. 1E illustrates another embodiment of a star cross-section of a self-degrading fiber of this invention. Shown generally is fiber end 124, outer shell 126, and core liquid 128. One should note that in some embodiments fiber end 124 may be closed (not pictured in FIG. 1E).

Figure 1F:
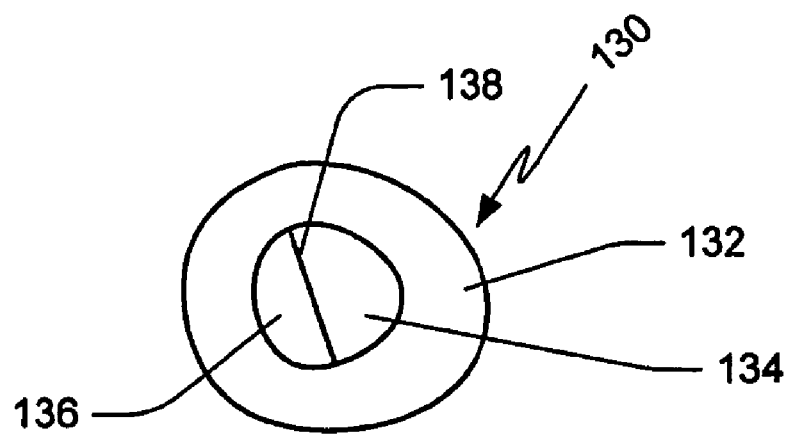
FIG. 1F illustrates another embodiment of a cross-section of a self-degrading fiber of this invention.

FIG. 1F illustrates another embodiment of a cross-section of a self-degrading fiber of this invention. Shown generally is fiber end 130, outer shell 132, a first core liquid 134 and a second core liquid 136. The first core liquid 134 and the second core liquid 136 may be separated by a barrier 138 that may be any suitable barrier (e.g., a membrane, a portion of the degradable polymer that forms the outer shell, etc.). In these embodiments, the first core liquid and the second core liquid may be chosen so as to interact in a certain way to produce a desired result. For instance, they both may facilitate the degradation of the outer shell or they may react with one another to produce a reaction product that will facilitate the degradation of the degradable polymer in the outer shell. Optionally, one of the core liquids may be chosen so that it facilitates the degradation of the degradable polymer of the outer shell of a self-degrading fiber and the second core liquid may be chosen to perform another function in the application. If desired and practicable, more than two core liquids (e.g., in multiple chambers) may be included inside the self-degrading fibers.

Fiber length, thickness, density, and concentration in a treatment fluid or composition are important variables when choosing the appropriate self-degrading fibers of this invention for a particular application. The self-degrading fibers may have any suitable physical dimensions. The behavior of the self-degrading fibers in a chosen application may be manipulated by manipulating the characteristics of the fibers, such as shape, size, volume of core liquid, etc. Factors to take into account when designing the self-degrading fibers to be used in a particular application include, but are not limited to, the desired geometry of any voids that will be created as a result of the degradation of the self-degrading fibers and the amount of core liquid needed to encourage degradation of the self-degrading fibers. In some embodiments, the self-degrading fibers may have an average or effective diameter of about 2 to about 200 microns, and a length of at least about 1 millimeter. The length of the fibers is limited only by the practical implications of handling, pumping, manufacturing, and the like. In some embodiments, a maximum length for the self-degrading fibers may be about 100 millimeters. An aspect ratio of greater than about 100 may be preferred in some applications. Additionally, the self-degrading fibers may have straight, crimped, curved, spiral-shaped, or other three-dimensional geometries if desired.

The density of the self-degrading fibers may be any suitable density appropriate for a chosen application. In certain embodiments, the density of the fibers should be such that the fibers remain distributed within the treatment fluid or composition in which they are being placed in a subterranean formation. For instance, in some fracturing embodiments, the density of the fibers is preferably about the same as any proppant particulates in the fracturing fluid. In most cases, this will range from about 1 to about 4 g/cm$^3$. Also, for some gravel packing applications, it is preferred that the fibers have a suitable density that will enable them to become incorporated into the resultant gravel pack as desired. In some embodiments, the self-degrading fibers may have a density of about 1 g/cm$^3$.

The concentration of self-degrading fibers in a treatment fluid or composition may vary depending on several factors. One factor is what the desired result is upon degradation of the self-degrading fibers. For instance, if a large percentage of voids are desired, then a larger concentration of self-degrading fibers may be required and vice-versa. Another factor is the ease with which the self-degrading fibers may be placed in a desired location. If it is difficult to place the fibers, a higher concentration may be required to offset this difficulty. Generally, the concentration of self-degrading fibers in a treatment fluid or composition may be from about 0.01% to about 75% of the treatment fluid or composition. Preferably, the fiber concentration ranges from about 0.1% to about 5% of the treatment fluid or composition.

As used herein, the term "treatment fluid" refers to any fluid that may be used in a subterranean application in conjunction with a desired function and/or for a desired purpose. The term "treatment fluid" does not imply any particular action by the fluid or any component thereof.

Methods of making the self-degrading fibers of this invention include any suitable method for forming hollow fibers. One such method involves extruding hollow fibers made from a desired degradable polymer; soaking the hollow fibers in a liquid that will be the core liquid; saturating the hollow fibers with the liquid; drying the exterior of the outer core of the fibers in such a manner that the liquid is retained in the hollow fibers and becomes a core liquid. Another method involves extruding a spinning solution of a chosen degradable polymer from an annular slit of a double pipe orifice to form a sheath solution while simultaneously, extruding a liquid through the inside pipe of the double pipe orifice to form a core liquid within the hollow fibers. Another method involves using capillary action to place the core liquid in an already formed suitable hollow fiber. Other suitable methods may be used as well.

Nonlimiting examples of degradable polymers that may be used in the self-degrading fibers of the present invention include, but are not limited to, homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerization for, such as, lactones, and any other suitable process. One of the important characteristics of suitable degradable polymers is that they are melt or solution processable. Specific examples of suitable polymers include aliphatic polyesters; poly(lactides); poly(glycolides); poly(ε-caprolactones); poly(hydroxybutyrates); polyanhydrides; aliphatic polycarbonates; poly(orthoesters); poly(amides); poly(urethanes); poly(hydroxy ester ethers); and poly(phosphazenes). One guideline for choosing which degradable polymer to use in a particular application is what degradation products will result. The differing molecular structures of the degradable polymers that are suitable for the present invention give a wide range of possibilities regarding regulating the degradation rate of the degradable polymers. In choosing the appropriate degradable polymer, one should consider the degradation products that will result. For instance, some may form an acid upon degradation; the presence of the acid may be undesirable; others may form degradation products that would be insoluble, and these may be undesirable. Moreover, these degradation products should not adversely affect other operations or components.

The degradability of a polymer depends at least in part on its backbone structure. One of the more common structural characteristics is the presence of hydrolyzable and/or oxidizable linkages in the backbone. The rates of degradation of, for example, polyesters, are dependent on the type of repeat unit, composition, sequence, length, molecular geometry, molecular weight, morphology (e.g., crystallinity, size of spherulites, and orientation), hydrophilicity, surface area, and additives. Also, the environment to which the polymer is subjected may affect how the polymer degrades, e.g., temperature, presence of moisture, oxygen, microorganisms, enzymes, pH, and the like. One of ordinary skill in the art with the benefit of this disclosure will be able to determine what the optimum polymer would be for a given application considering the characteristics of the polymer utilized and the environment to which it will be subjected.

Of these suitable polymers, aliphatic polyesters are preferred. Of the suitable aliphatic polyesters, polyesters of α or β hydroxy acids are preferred. Poly(lactide) is most preferred. Poly(lactide) is synthesized either from lactic acid by a condensation reaction or more commonly by ring-opening polymerization of cyclic lactide monomer. The lactide monomer exists generally in three different forms: two stereoisomers L- and D-lactide and D,L-lactide (meso-lactide). The chirality of the lactide units provides a means to adjust, inter alia, degradation rates, as well as physical and mechanical properties after the lactide is polymerized. Poly(L-lactide), for instance, is a semicrystalline polymer with a relatively slow hydrolysis rate. This could be desirable in applications of the present invention where slow degradation of the self-degrading fiber is desired. Poly(D,L-lactide) is an amorphous polymer with a much faster hydrolysis rate. This may be suitable for other applications of the methods and compositions of the present invention. The stereoisomers of lactic acid may be used individually or combined for use in the compositions and methods of the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other aliphatic polyesters. For example, the degradation rate of the PLA may be affected by blending high and low molecular weight lactide, by using mixture of polylactide and lactide monomer or by blending polylactide with other aliphatic polyesters.

The physical properties of degradable polymers (and, therefore, at least in part, the self-degrading fibers) may depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, extensional viscosity with tension-stiffening behavior. The properties of the particular polymer utilized can be further tailored by blending, and copolymerizing it with another polymer, or by a change in the macromolecular architecture (e.g., hyper-branched polymers, star-shaped, or dendrimers, etc.). The properties of any such suitable degradable polymers (such as hydrophilicity, rate of biodegradation, etc.) can be tailored by introducing functional groups along the polymer chains. One of ordinary skill in the art with the benefit of this disclosure will be able to determine the appropriate functional groups to introduce to the polymer chains to achieve the desired effect.

Suitable core liquids include any liquid capable of being held within the outer shell of the self-degrading fibers of this invention. Liquids that may aid the degradation of the degradable polymer of the outer shell are preferred. Such liquids include alcohols, acids, bases and aqueous-based liquids. The core liquid may comprise, for example, fresh water, saltwater (e.g., water containing one or more salts dissolved therein), brine (e.g., saturated salt water), or seawater. The water can be from any source as long as it does not contain an excess of compounds that adversely affect other components in the viscosified treatment fluid. Suitable alcohols include those that are capable of interacting with the degradable polymer such that the degradable polymer degrades (for example through transesterification with the polymer backbone of the degradable polymer). An example of a suitable acid includes glacial acetic acid.

Optionally, the core liquid in an embodiment of the self-degrading fibers of this invention may comprise chosen additives. Such additives may be desirable, for example, to aid in the degradation of the degradable polymer or to retard the degradation of the degradable polymer. The additive also may be chosen to perform a second function in a well bore. For example, an oxidizer additive may be included in the core liquid that may be used in the well bore, for example, as a breaker. Examples of suitable additives include, but are not limited to, corrosion inhibitors, chelators, enzymes, and breakers.

In additional embodiments, the self-degrading fibers may be coated with a desirable coating. Such coatings may be desirable where it may be beneficial to disperse the self-degrading fibers in a particular fashion within the medium in which the self-degrading fibers are being used, or when it is desirable to alter the degradation rate of the outer shell. A coating also may be desirable when it is preferable to control how the self-degrading fibers consolidate within a matrix (e.g., a proppant matrix or a gravel pack). Any suitable coating that may perform any one of these functions is suitable for use in conjunction with the present invention.

One example of a coating that may be used in conjunction with some embodiments of the self-degrading fibers of the present invention is an adhesive coating. An adhesive coating may be useful, for example, to encourage the fibers to adhere to a substrate (which may be other self-degrading fibers), a portion of a subterranean formation, proppant particulates, gravel particulates, and the like. The adhesive coating may be incorporated with the self-degrading fibers during manufacture or subsequent thereto. The coating may be applied to an entire self-degrading fiber or on any portion thereof. The coating may be sprayed or otherwise applied to the material during the coating process. One form of adhesive which may be used is one that will set over time after the self-degrading fibers have been introduced into a subterranean formation. An alternative adhesive might be one that upon treatment with a catalyst (which is either introduced with the self-degrading fibers into the subterranean formation or prior to or subsequent to addition of the self-degrading fibers to the subterranean formation) whereby the catalyst contacts the adhesive coating within the subterranean formation so as to activate the adhesive.

An example of an additive that may be included in a core liquid and/or coated on a self-degrading fiber that may aid the degradation of the degradable polymer is an enzyme. Protease enzymes have been shown to hasten the hydrolysis or degradation of PLA. Protease enzymes are also known as "proteinases" or "proteinase enzymes." Esterases and lipases may also be suitable for other degradable polymers, like poly(hydroxybutyrates) or, aliphatic polyesters. Typically, these enzymes are isolated from plants, animals, bacteria, and fungi, and there are very many available commercially. A preferred type of protenase enzyme that is useful in the present invention is proteinase K. In certain embodiments of the present invention, the protease enzymes in the enzyme compositions may be spray-dried, freeze-dried, or the like. In certain embodiments, the protease enzymes of the compositions of the present invention may be provided, inter alia, in a purified form, in a partially purified form, as whole cells, as whole cell lysates, or any combination thereof. The concentration of the protease enzymes in the core liquid and/or in the coating should be an amount effective to hasten hydrolysis of the degradable polymer in the well bore to a desired degree at given conditions. For instance, if a relatively faster hydrolysis rate is desired, then a higher concentration of the protease enzymes should be included. The actual amount included with depend on, inter alia, the temperature of the well bore, the concentration of the degradable polymer, the particular enzyme chosen, and the desired hydrolysis rate.

The self-degrading fibers of this invention may be used in any subterranean application wherein it is desirable for the self-degrading fibers to degrade, e.g., to leave voids, act as a temporary restriction to the flow of a fluid, or produce desirable degradation products. For instance, an example of a method of treating a portion of a subterranean formation comprises: providing a treatment fluid comprising a plurality of self-degrading fibers; placing the treatment fluid into a subterranean formation; and treating a portion of the subterranean formation. The terms "treatment" and "treating" do not imply any particular action with or by the self-degrading fibers or degradation products of the self-degrading fibers of the present invention. Moreover, the self-degrading fibers of the present invention are especially suitable for subterranean applications including, but not limited to, cementing (e.g., regular or acid soluble cement compositions), fracturing, or gravel packing applications.

In some embodiments, the self-degrading fibers of this invention may be used in conjunction with hydraulic cement compositions and their associated applications, including, but not limited to, primary cementing, sand control, and fracturing. In an example of a primary cementing method embodiment, a plurality of self-degrading fibers of this invention may be included in a cement composition that comprises a hydraulic cement, water, and any optional additives. The cement composition can then be used in a primary cementing application in a subterranean operation. An example of such a method comprises the steps of: providing a cement composition that comprises a hydraulic cement, water, and a plurality self-degrading fibers of this invention; placing the cement composition in the subterranean formation; and allowing the cement composition to set therein and the self-degrading fibers to degrade. The quantity of self-degrading fibers to include in a cement composition used in a primary cementing operation may range from about 0.01% to about 15% based on the amount of hydraulic cement in the composition. An example of an embodiment of a method is a method comprising: providing a cement composition that comprises a hydraulic cement, water, and a plurality of self-degrading fibers, the self-degrading fibers comprising an outer shell and a core liquid; placing the cement composition in a subterranean formation; and allowing the cement composition to set therein.

The self-degrading fibers of this invention also may be used in a sand control application in a permeable cement composition. An embodiment of a method is a method of providing some degree of sand control to a portion of a subterranean formation penetrated by a well bore comprising: providing a gravel pack fluid comprising gravel particulates and a plurality of self-degrading fibers, the self-degrading fibers comprising an outer shell and a core liquid; and placing the gravel pack fluid into the subterranean formation so that a permeable gravel pack forms adjacent to a portion of the subterranean formation. Another embodiment of providing sand control in a well bore penetrating a subterranean formation comprises the following steps: placing a perforated shroud having perforations, the perforations being sealed by a temporary sealant, in the well bore adjacent to a chosen portion of the subterranean formation; providing a permeable cement composition, the permeable cement composition comprising a hydraulic cement, water, and a plurality of self-degrading fibers; placing the permeable cement composition in an annulus between the perforated shroud and the portion of the subterranean formation; allowing the permeable cement composition to set to form a permeable cement mass in the annulus; and removing the temporary sealant sealing the perforations of the perforated shroud to restore liquid communication between the well bore and the subterranean formation.

The self-degrading fibers may be used in fracturing applications as well, either in conjunction with any suitable fracturing fluid, including a conventional fracturing fluid that comprises a base fluid and a viscosifying agent or a fracturing fluid that comprises a cement composition. One example of these methods of the present invention includes the following steps. A permeable cement composition of the present invention is prepared (either on-the-fly or by a preblending process) that comprises a hydraulic cement, water, and a plurality of self-degrading fibers of this invention. The permeable cement composition is injected into the subterranean formation at a sufficient pressure to create a fracture in the formation. The permeable cement composition is allowed to set in the fracture, whereby the composition fills and forms a permeable cement matrix therein. After the permeable cement proppant matrix has been formed in the well bore, the well is produced and the permeable cement matrix acts, inter alia, to maintain the integrity of the fractures within the formation and allow formation fluids to flow into the well bore. Produced liquids and gases are allowed to flow through the permeable cement matrix, but formation sands in the formation are substantially prevented from passing through the matrix. The self-degrading fibers may be incorporated into the cement composition and become distributed throughout the resultant cement matrix, most preferably uniformly, as the cement matrix forms. After the requisite time period dictated by the characteristics of the self-degrading fibers utilized, the self-degrading fibers are substantially removed from the matrix. As a result, voids are created in the matrix. These voids enhance the permeability of the matrix, which results in, inter alia, enhanced fracture conductivity. Enhanced fracture conductivity enhances well productivity, as well productivity is a function of, inter alia, fracture conductivity. In certain preferred embodiments, these voids are channel-like and interconnected so that the permeability of the matrix is enhanced.

The self-degrading fibers also may be used in a fracturing operation that does not involve a cement composition to form a proppant pack in a fracture having voids to increase its permeability. An example of such a method of the present invention is a method of increasing the conductivity of a fracture in a subterranean formation that comprises the steps of: providing a fracturing treatment fluid comprising a proppant composition, the proppant composition comprising proppant particulates and a plurality of self-degrading fibers; introducing the proppant composition into the fracture; and allowing the proppant composition to form a proppant matrix having voids in the fracture. In these fracturing methods, any suitable fracturing fluid and any suitable proppant particulates may be used. The fracturing fluid may comprise a base fluid (such as an aqueous fluid) and any suitable viscosifying agent (such as a biopolymer).

The self-degrading fibers also may be incorporated within a gravel pack composition so as to form a gravel pack down hole that has some permeability from the degradation of the self-degrading fibers. In an example of such a method, a gravel pack fluid that comprises gravel and a plurality of self-degrading fibers is placed within a well bore so as to form a gravel pack therein. The self-degrading fibers are allowed to degrade so that the gravel pack develops some permeability.

In another embodiment, the self-degrading fibers may be incorporated into a gravel pack composition such that when they degrade, they assist in the degradation of a filter cake neighboring the gravel pack. This method is most suited for use with self-degrading fibers that form an acid upon degradation. This acid can be used to degrade an acid-soluble component in the filter cake. An example of such a method of degrading a filter cake in a subterranean formation comprises the steps of: providing a gravel pack composition that comprises gravel particulates and a plurality of self-degrading fibers; placing the gravel pack composition into a subterranean formation so that a gravel pack forms that neighbors a filter cake; allowing the self-degrading fibers to degrade so as to produce an acid; and allowing the acid to contact and degrade a portion of the filter cake. In these sand control methods, any suitable gravel pack composition and any suitable gravel particulates may be used.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A subterranean treatment fluid comprising a base fluid and a plurality of self-degrading fibers, the self-degrading fibers comprising an outer shell, wherein the outer shell of at least one of the self-degrading fibers comprises at least one material selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(urethane); a poly(hydroxy ester ether); a poly(phosphazene); and any combination thereof, wherein the fiber concentration is about 0.1% to about 5.0% of the treatment fluid and a core liquid, wherein the core liquid catalyzes or facilitates degradation of the outer shell and comprises at least one material selected from the group consisting of: an alcohol, an acid, an aqueous-based fluid, and any combination thereof.

2. The subterranean treatment fluid of claim 1 wherein the treatment fluid is a fracturing fluid or a gravel pack fluid.

3. The subterranean treatment fluid of claim 1 wherein the outer shell of at least one of the self-degrading fibers comprises at least one poly(orthoester).

4. The subterranean treatment fluid of claim 1 wherein at least one of the self-degrading fibers has a round cross-sectional shape, an oval cross-sectional shape, a trilobal shape, a star shape, a flat shape, a rectangular shape, or any combination thereof.

5. The subterranean treatment fluid of claim 1 wherein at least one of the self-degrading fibers further comprises a coating that comprises at least one element selected from the group consisting of: an adhesive, an enzyme, and any combination thereof.

6. The subterranean treatment fluid of claim 1 wherein at least one of the self-degrading fibers has a diameter of about 2 microns to about 200 microns and a length of at least about 1 millimeter.

7. The subterranean treatment fluid of claim 1 wherein at least one of the self-degrading fibers has an aspect ratio of greater than about 100.

8. The subterranean treatment fluid of claim 1 wherein at least one of the self-degrading fibers is straight, crimped, curved, spiral-shaped, or any combination thereof.

9. The subterranean treatment fluid of claim 1 wherein at least one of the self-degrading fibers has a density of about 1 to about 4 g/cm$^3$.

10. The subterranean treatment fluid of claim 1 wherein the core liquid comprises an additive.

11. The subterranean treatment fluid of claim 10 wherein the additive comprises at least one element selected from the group consisting of: a corrosion inhibitor, a chelator, an enzyme, a breaker, and any combination thereof.

12. The subterranean treatment fluid of claim 1 wherein the outer shell has a closed fiber end.

13. The subterranean treatment fluid of claim 1 wherein the core liquid comprises a plurality of core liquids.

14. A cement composition comprising a hydraulic cement, and a plurality of self-degrading fibers, the self-degrading fibers comprising an outer shell and a core liquid wherein the outer shell of at least one of the self-degradable fibers comprises at least one material selected from the group consisting of: an aliphatic polyester; a poly(lactide); a poly(glycolide); a poly($\epsilon$-caprolactone); a poly(hydroxybutyrate); a polyanhydride; an aliphatic polycarbonate; a poly(orthoester); a poly(amide); a poly(urethane); a poly(hydroxyl ester ether); a poly(phosphazene); and any combination thereof, wherein the core liquid catalyzes or facilitates degradation of the outer shell.

15. The cement composition of claim 14 wherein the outer shell of at least one of the self-degrading fibers comprises at least one poly(orthoester).

16. The cement composition of claim 14 wherein the core liquid of at least one of the self-degrading fibers comprises at least one material selected from the group consisting of: an alcohol, an acid, an aqueous-based fluid, and any combination thereof.

17. The cement composition of claim 14 wherein the core liquid comprises at least one additive selected from the group consisting of: a corrosion inhibitor, a chelator, an enzyme, a breaker, and any combination thereof.

* * * * *